US006999437B2

(12) United States Patent
Krishnamurthi et al.

(10) Patent No.: US 6,999,437 B2
(45) Date of Patent: Feb. 14, 2006

(54) END-TO-END LOCATION PRIVACY IN TELECOMMUNICATIONS NETWORKS

(75) Inventors: Govindarajan Krishnamurthi, Arlington, MA (US); Hemant M. Chaskar, Woburn, MA (US); Ritva Tellervo Siren, Helsinki (FI)

(73) Assignee: Nokia Corporation, Espoo (FI)

( * ) Notice: Subject to any disclaimer, the term of this patent is extended or adjusted under 35 U.S.C. 154(b) by 319 days.

(21) Appl. No.: 10/320,637

(22) Filed: Dec. 17, 2002

(65) Prior Publication Data

US 2004/0114558 A1    Jun. 17, 2004

(51) Int. Cl.
*H04Q 7/00* (2006.01)
(52) U.S. Cl. .................. 370/331; 370/401; 370/389; 370/338; 455/432.1
(58) Field of Classification Search ............... 370/331, 370/401, 338, 351, 392, 389; 455/432, 436, 455/432.1
See application file for complete search history.

(56) References Cited

U.S. PATENT DOCUMENTS

| | | | | |
|---|---|---|---|---|
| 6,240,514 | B1 * | 5/2001 | Inoue et al. ................. | 713/153 |
| 6,621,810 | B1 * | 9/2003 | Leung .......................... | 370/338 |
| 6,625,135 | B1 * | 9/2003 | Johnson et al. ............. | 370/332 |
| 6,915,325 | B1 * | 7/2005 | Lee et al. .................... | 709/202 |
| 6,947,401 | B1 * | 9/2005 | El-Malki et al. ............ | 370/331 |
| 2002/0009066 | A1 * | 1/2002 | Shimizu et al. ............. | 370/338 |
| 2002/0015396 | A1 * | 2/2002 | Jung ........................... | 370/338 |
| 2003/0093553 | A1 * | 5/2003 | Le et al. ...................... | 709/238 |

OTHER PUBLICATIONS

Myles et al. "A mobile host protocol supporting route optimization and authentication," Jun. 1995, IEEE Journal on vol. 3, Issue 5, pp. 839-849.*
C. Perkins, "IP Encapsulation within IP", Network Working Group, printed from http://www.ietf.org/rfc/rfc2003.txt?number=2003 on Nov. 25, 2002, 14 pages.
C. Perkins, "Minimal Encapsulation within IP", Network Working Group, printed from http://www.ietf.org/rfc/rfc2004.txt?number=2004 on Nov. 25, 2002, 6 pages.
G. Montenegro, "Reverse Tunneling for Mobile IP", Network Working Group, printed from http://www.ietf.org/rfc/rfc2344.txt?number=2344 on Oct. 21, 2002, 18 pages.

(Continued)

*Primary Examiner*—Ricky Ngo
*Assistant Examiner*—Nittaya Juntima
(74) *Attorney, Agent, or Firm*—Banner & Witcoff (57) ABSTRACT

A method and system for routing messages between hosts while maintaining end-to-end location privacy are disclosed. In order to make routing more efficient, while maintaining location privacy, an encapsulation cache may be created in access routers that have a trust relationship with the respective home networks of the hosts. The encapsulation cache can be used to store home-address to care-of-address correspondences so that the access router, when a host is roaming, can route a message directly to the message's intended recipient, yet still maintain location privacy for the sending host by replacing the host's care-of address at the roaming network with the host's home address.

60 Claims, 3 Drawing Sheets

OTHER PUBLICATIONS

G. Montenegro, "Reverse Tunneling for Mobile IP, revised", Network Working Group, printed from http://www.ietf.org/rfc/rfc3024.txt?number=3024 on Nov. 25, 2002, 29 pages.

C. Perkins, "IP Mobility Support for IPv4", Network Working Group, printed from http://www.ietf.org/rfc/rfc3344.txt?number=3344 on Nov. 25, 2002, 93 pages.

Stafano M. Faccin et al., "Location Privacy for IPv6 nodes", Mobile IP WG, Internet-Draft, Nov. 2001, 20 pages.

Claude Castelluccia, "A Simple Privacy Extension for Mobile IPv6", Internet Engineering Task Force, Internet-Draft, Feb. 2001, 8 pages.

A. Mankin et al., "Geographic Location/Privacy (geopriv)", printed from http://www.ietf.org/html.charters/geopriv-charter.html on Oct. 21, 2002, 3 pages.

J. Cuellar et al., "Geopriv requirements", Internet Draft, printed from http://www.ietf.org/internet-drafts/draft-ietf-geopriv-reqs-00.txt on Oct. 21, 2002, 23 pages.

"Ethereal", The Ethereal Network Analyzer, printed from http://ethereal.com on Oct. 21, 2002, 4 pages.

"Visualware", whois, ping, traceroute, internet connectivity—VisualRoute by Visualware, printed from http://www.visualware.com/visualroute/index.html on Oct. 21, 2002, 4 pages.

* cited by examiner

*FIG. 1*

| CoA | HoA | HA | Expiration | AR | ASSOC. DATA |
|---|---|---|---|---|---|
| 192.145.3.37 | 178.23.124.3 | 178.23.124.1 | 12000000 | 192.145.3.1 | HOA |
| 164.34.12.96 | 112.1.1.100 | 112.1.1.1 | 12/12/02 | 164.34.12.32 | COA |
| 202.100.3.3 | 87.76.65.54 | 87.76.65.32 | 10 MSG | 202.100.3.1 | HA |
| 96.134.8.178 | 143.165.1.30 | 143.165.1.1 | 1 DAY | 96.134.8.1 | ARA |

END-TO-END LOCATION PRIVACY IN TELECOMMUNICATIONS NETWORKS

FIELD OF THE INVENTION

The invention relates generally to telecommunications networks. More specifically, the invention provides end-to-end location privacy for hosts communicating via an Internet Protocol (IP) based telecommunications network, such that a message interceptor cannot determine the geographic location of the hosts. Further, communicating hosts cannot determine the geographic location of each other.

BACKGROUND OF THE INVENTION

As Internet Protocol (IP)-based data networks become more prevalent for new forms of communication, e.g., for mobile telecommunications traditionally done via Public Switched Telephone Networks (PSTN), location privacy of communicating hosts becomes an important problem to address. In an IP network, each packet carries an IP address corresponding to a source (sender), and an IP address corresponding to a destination (receiver). These IP address are necessary and are used by the network to route the packets from the source to the destination. However, these IP addresses may have a strong correlation with the geographic location where the sender/receiver is currently located. Hence, the current geographic location of sender/receiver can be determined by examining the IP address in the packets.

IP addresses are assigned to users or entities by a centralized source, e.g., in North America, South America, sub-Saharan Africa, and the Caribbean, the American Registry for Internet Numbers (ARIN) assigns IP addresses to various organizations such as enterprises, universities, Internet service providers, wireless network operators etc. Other geographic regions have corresponding assignment entities, for example Asia Pacific Network Information Center (APNIC) for the Asia Pacific region. Because IP addresses, once assigned, are relatively static, a malicious user can almost always determine a sending user's and/or recipient user's general geographic location based on the IP addresses associated with their packets. That is, during a given communication session, a sender/receiver uses an IP address from a pool of IP addresses assigned to the organization from where the user communicates, thus unknowingly revealing the user's geographic location. Publicly available tools, such as ARIN's WHOIS database (publicly searchable by IP address), trace-route, Ethereal, VisualRoute and similar software and in resolving an IP address to a specific entity, and further to a specific location. These publicly and commercially available software packages can pinpoint the location of a user with reasonable accuracy using only the source and/or destination IP address of IP packets.

For example, suppose a malicious user intercepts a message with the destination IP address 64.218.151.200. A search of the ARIN WHOIS database reveals that the IP address is leased by Nokia Inc. from a pool of addresses assigned to the Internet service provider Southwestern Bell Internet Services. Since Southwestern Bell provides service in the USA, an immediate conclusion is that the receiver of the IP packet is in the USA. Further, by searching for Nokia office locations in the country where Southwestern Bell provides Internet services, the location of the receiver can be further pinpointed to Texas. As a further example, ARIN WHOIS search reveals that the address range 18.0.0.0 to 18.255.255.255 is assigned to the Massachusetts Institute of Technology, Cambridge, Mass., USA. Thus, the sender/receiver using an IP address in this range is most likely in Cambridge, Mass. Similar searches, as well as known techniques for monitoring IP address patterns, allow a malicious user to determine a user's general geographic location, which the user may want to keep private.

Many users do not want others to be able to pinpoint their current location and thus track their movement, as this is widely regarded as an invasion of one's privacy. Malicious users who track other users' locations could use the geographic data obtained for inappropriate, unlawful, or undesired purposes, such as by selling a profile of a user's movement to advertisers. It could be also used for criminal purposes. For example, knowing that a person living in the USA is currently calling from Germany implies that he/she cannot return home for at least 8 hours or more. Further, the respective governments may mandate that the end users' location privacy cannot be compromised during communication. Location privacy in the context of the current invention refers to the ability to keep one's geographic location private while communicating over an IP network. Location privacy also includes the ability to mask one's current geographic location from even an authorized recipient of a message. That is, the sender of an IP message might not want the intended recipient of the message to be able to determine the sender's general geographic location, except as desired by the sender.

Several prior solutions have attempted to maintain location privacy, with varying degrees of success. One known solution is the use of reverse tunneling, as taught in the Internet Engineering Task Force's (IETF) specification Request For Comments (RFC) 2344 and RFC 3024. Reverse tunneling in which packets are routed through the respective Home Agents of the sender and the receiver (i.e., routers having Home Agent functionality on their home networks) is an existing methodology to provide end-to-end location privacy. In reverse tunneling, the source address in a packet from a sender host, referred to herein as a mobile node (MN), as received at the correspondent mobile node (CN) is always the MN's home address (i.e., address on the home network). When the MN is roaming in another network (using a "Care of Address," CoA1, provided by the roaming network), the MN's packets with source and destination addresses as the MN's Home Address (HoA1) and the CN's home address (HoA2) are encapsulated within a packet sent to the MN's Home Agent (HA1). The Home Agent then strips the external headers and forwards the internal packet to the CN's home network. The correspondent node's home agent (HA2) then encapsulates the packet in yet another packet and directs this second encapsulated packet to the CN's current care of address (CoA2), e.g., if the CN is also roaming in yet another network. While this scheme provides location privacy to the nodes involved (they see packets as coming from each others' HoAs), the routing performance suffers as the distance of the two communicating Home Agents increases, e.g., in terms of physical distance or IP hops, from either each other or from the MN's and CN's current locations. Also, if many mobile nodes request privacy, because all packets are routed through the Home Agents, the process might not be economically and/or technologically scalable as the load on each Home Agent may quickly deteriorate the performance of the Home Agent.

Another known approach uses a private address for each of the communicating nodes (MN and CN). The main motivation for the use of private addresses, at least initially, was the lack of sufficient global address space in IPv4. When using private addresses, the gateways (often called as NATs or Network Address Translators) perform conversion from private IP address to public IP address when the packets leave the private network. NATs are usually placed at the edge of the private network or the virtual private network (VPN) of an organization. If the organization is a global entity (for example the Red Cross), it is difficult to pinpoint the actual location of a communicating node by examining the public IP address in the packets. This is because the IP address that appears in the packets when they enter the public Internet is that of the NAT. The packets are routed between the NAT and the communicating node over a VPN before they enter the public Internet, and the VPN may span a large geographical area. Thus a communicating node using a private address can be in one region, while the NAT can be in another region. However, this approach fails if the VPN does not span a large geographic area. This is the case for smaller or regional organizations. Even for those VPNs which span a large geographic area, packets are usually routed from the communicating node to the nearest NAT, and thus the location information can still be revealed. There are also difficulties with respect to different mobility management algorithms and end-to-end security and packet integrity algorithms working with private address spaces. This solution also creates circuitous routes from a mobile node to its correspondent node because all traffic is routed through one or more NATs to translate private addresses to public addresses. Also, the requirement that all traffic must flow through NAT causes overload on NATs and makes them unscalable. This also creates potential single point of failure in the network.

Another known solution, such as is described in S. M. Faccin and F. Le, "Location Privacy for IPv6 nodes", Internet Draft Document (to be submitted), November 2001, advocates the use of Location Privacy Agents to provide location privacy. In this scheme, the HA of the MN tries to find a router "close" to the CN's current point of attachment to the Internet to act as a Location Privacy Agent (LPA). The address of the LPA is then communicated to the MN. The MN sends packets to LPA and LPA sends them to the CN. This way, to the CN, packets appear to be originating from the LPA. However, since the MN knows the address of LPA and LPA is located close to the CN's point of attachment to the Internet, approximate geographical location of the CN is revealed to the MN. In other words, it is not possible to provide mutual location privacy to communicating nodes with this scheme. Thus this scheme may suffice for client-server applications where the MN is a mobile client node and the CN is a (stationary) server node such as WWW server, but is not sufficient for peer-to-peer applications such as voice calls in which both MN and CN may be mobile and may want to protect their location privacy. Another solution, described in C. Castelluccia and F. Dupont, "A Simple Privacy Extension for Mobile IPv6", Internet Draft Document (Expires August 2001), February 2001, uses Hierarchical Mobile IPv6 (HMIPv6) Mobile Anchor Points (MAPs) to provide Location Privacy. A MAP acts as a representative for a collection of access routers. In other words, the node's care of address is anchored at a MAP and does not disclose as to which access router or access subnet the node is actually attached to. However, a MAP represents access routers that are in the vicinity of it. The location of a MAP can be determined from the IP address the node is using for communication. Hence, it is possible to locate the MN to the particular region, albeit with reduced granularity of accuracy. While this solution provides better location privacy than traditional Mobile IPv6, it still does not solve the problem completely. Also, this solution suffers from drawbacks such as overload on MAPs and potential single point of network failure at a MAP, due to its centralized approach.

In the future, it is highly probable that IP networks, or IP backbones, will carry a large number of communication sessions between mobile users, e.g., two users communicating via mobile terminals over a wireless telecommunications network. Thus, it would be an advancement in the art to provide a location privacy mechanism to mask a user's general geographic location from others who seek to exploit a location-indicative address associated with the user, where the location privacy mechanism is not limited by the above-mentioned drawbacks and limitations.

SUMMARY OF THE INVENTION

To overcome limitations in the prior art described above, and to overcome other limitations that will be apparent upon reading and understanding the present specification, the present invention provides flexible and efficient location privacy to communicating nodes in a telecommunications network by combining aspects of route optimization and reverse tunneling.

A first aspect of the invention uses encapsulation caches to provide route optimization while maintaining location privacy by storing the encapsulation caches, containing care-of-address to home-address binding information at access routers other than the respective home agents of communicating nodes. Subsequent routing is then based on the binding information stored in the encapsulation caches instead of routing all messages through the home agents.

A second aspect of the invention provides methods and systems for routing by an access router of a sending node while maintaining location privacy. The access router receives a first packet having a destination address indicating the address of the home agent for the sending node, and sends the first packet to the home agent of the sending node as in reverse tunneling. However, in response, the access router receives home address to care-of address binding information corresponding to the receiving host. When the access router receives a subsequent packet from the sending node, the access router routes this packet based on the received binding information instead of sending the packet to the home network of the sending host Another aspect of the invention provides methods and systems for routing packets to a receiving host by an access router corresponding to the receiving host. When the access router receives a packet having a source address of a sending host or the access router of the sending host and a destination address corresponding to the receiving host or the access router of the receiving host, the access router performs certain header stripping and address swapping functions based on the received information (now stored in an encapsulation cache), and sends the packet to the receiving host.

Other methods and systems may also be used for establishing and maintaining encapsulation caches, including establishment of the encapsulation caches by home agents of corresponding nodes, such as mobile terminals. Also, once encapsulation caches are created in the access routers a number of alternatives for packet encapsulation, forwarding and de-encapsulation can be used.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Aspects of the present invention combine the advantages of route optimization and reverse tunneling to provide flexible and efficient location privacy to communicating nodes (sender and receiver). Route optimization refers to routing of IP packets between a sender and a receiver over a "direct path" between their current associated access routers, rather than inefficient routing (often called "dog-legged routing" or "triangle routing") through their respective home agents as in known reverse tunneling methodologies. Nonetheless, using the present invention, regardless of a user's actual location, packets can appear as if they originated from the respective user's home address or location, so that the recipient can never be certain of the user's actual location. Based on trust relationships between the network entities (discussed further, below), encapsulation cache can be maintained at each node's corresponding access router (AR) to enable route optimization while not compromising user's location privacy. Route optimization provides a significant performance improvement over standard reverse tunneling methodologies.

Figure 1:
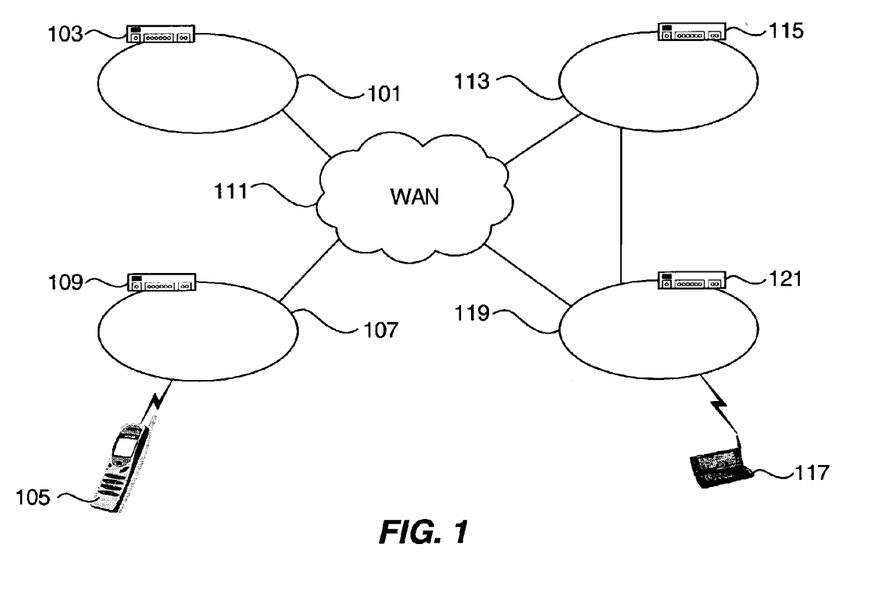
FIG. 1 illustrates a network architecture that may be used with one or more illustrative embodiments of the invention.

FIG. 1 illustrates a network architecture that may be used in accordance with one or more illustrative embodiments of the invention. A telecommunications network 101 has a corresponding router 103. The network 101 is the home network of the mobile terminal 105. The router 103 is the home agent (HA) for the mobile terminal 105. The home agent, generally, is a router with special functionality, acting as a representative for a MN when the MN moves away from its home network. The HA intercepts any packets arriving for the MN at the MN's home address and re-routes them to the MN's current location.

A mobile terminal 105 whose home network is telecommunications network 101 may be roaming on a second telecommunications network 107. Network 107 has a corresponding access router (AR) 109. The AR 109 is a router where mobile terminal 105 currently connects to the network 107 on IP level. Network 101 and network 107 may each be connected to a wide area network (WAN) 111, such as the Internet, through which they can communicate with each other and other networks.

A third telecommunications network 113 has corresponding HA 115 for a mobile terminal 117, and fourth telecommunications network 119 has corresponding access router 121 for the mobile terminal 117. The mobile terminal 117 whose home network is telecommunications network 113 may be roaming on network 119. Mobile terminal 117 currently connects to the network 119 on IP level at AR 121. Network 113 and network 119 may each be connected to wide area network (WAN) 111, through which they can communicate with each other and other networks. One of skill in the art will appreciate that two or more of the networks may be directly connected, bypassing the need to communicate through WAN 111. For example, network 113 and network 119 may also have a direct connection, as is illustrated in FIG. 1.

Each telecommunications network may be any type of telecommunications network, e.g., a wireless telecommunications network (GPRS, UMTS, cdma2000, 1xRTT, 1xEvDV etc.) including one or more base stations (not shown) through which wireless mobile terminals communicate with the wireless telecommunications network, or a wireless local area network (IEEE 802.11, IEEE 802.15, HiperLAN etc.), or a wired local area network such as Ethernet, or a mesh network covering wide area such as an Internet service provider network. Each network may carry voice and data messages, and may support Internet protocol (IP)-based communications. Each mobile terminal may be any mobile wireless device, e.g., device 105 or device 117, capable of communicating with one or more of networks 101, 107, 113, and 119. For example, by way of illustration and not limitation, mobile terminals may include mobile telephones, wireless personal digital assistants (PDAs), laptop or notebook computers, tablet-based computers, vehicles with integrated wireless communications capabilities, and the like.

Assume that mobile terminals 105 and 117 desire to communicate with each other while roaming on networks 107 and 119, respectively, while maintaining location privacy. Assume mobile terminal 105, referred to as the originating mobile node (MN), is the originator of the communication session. Mobile terminal 117 is then referred to as the correspondent mobile node (CN).

Because each mobile terminal is roaming on a non-home network, each mobile terminal may have two addresses with which it is associated: a home address on the mobile terminal's respective home network, and a care-of address on the mobile terminal's respective roaming network. These addresses are usually taken from pools of addresses assigned to respective networks by the respective address assignment authorities. The home address of MN mobile terminal 105 is referred to herein as Home Address 1 (HoA1); the current care-of address of MN mobile terminal 105 is referred to herein as Care-of-Address 1 (CoA1); the home address of CN mobile terminal 117 is referred to herein as Home Address 2 (HoA2); and the current care-of address of CN mobile terminal 117 is referred to herein as Care-of-Address 2 (CoA2). The address of the router 103 on the home network 101 of mobile terminal 105 is referred to herein as Home Agent Address 1 (HAA1), the address of router 115 on the home network 113 of mobile terminal 117 is referred to herein as Home Agent Address 2 (HAA2), the address of AR 109 in network 107 is referred to as Access Router Address 1 (ARA1) and that of the AR 121 in network 119 is referred to as Access Router Address 2 (ARA2). Each address is an IP address. The HA router 103 on the home network 101 of mobile terminal 105 is referred to herein as Home Agent 1 (HA1). The HA router 115 on the home network 113 of mobile terminal 117 is referred to herein as Home Agent 2 (HA2).

There may be a trust relationship needed between AR1 and HA1, HA1 and HA2 and HA2 and AR2. A trust relationship refers to each network that is a party to the trust relationship being able to trust the data sent from or control information provided by the other party to the trust relationship. Such a trust relationship also allows a trusted node (e.g., AR 109) to adopt some functionality on behalf of another trusted node (e.g., HA1). This trust relationship allows the home agents to transfer some of the home agent functionality pertaining to the mobile nodes 105 and 117, to the access routers for a particular period of time. Such a trust relationship could be established either through Service Level Agreements (SLAs), roaming agreements or through third party authentication, AAA (Authentication, Authorization and Accounting) brokers, using certificates issued by a certificate authority, or any other mechanism known in the art.

Figure 2:
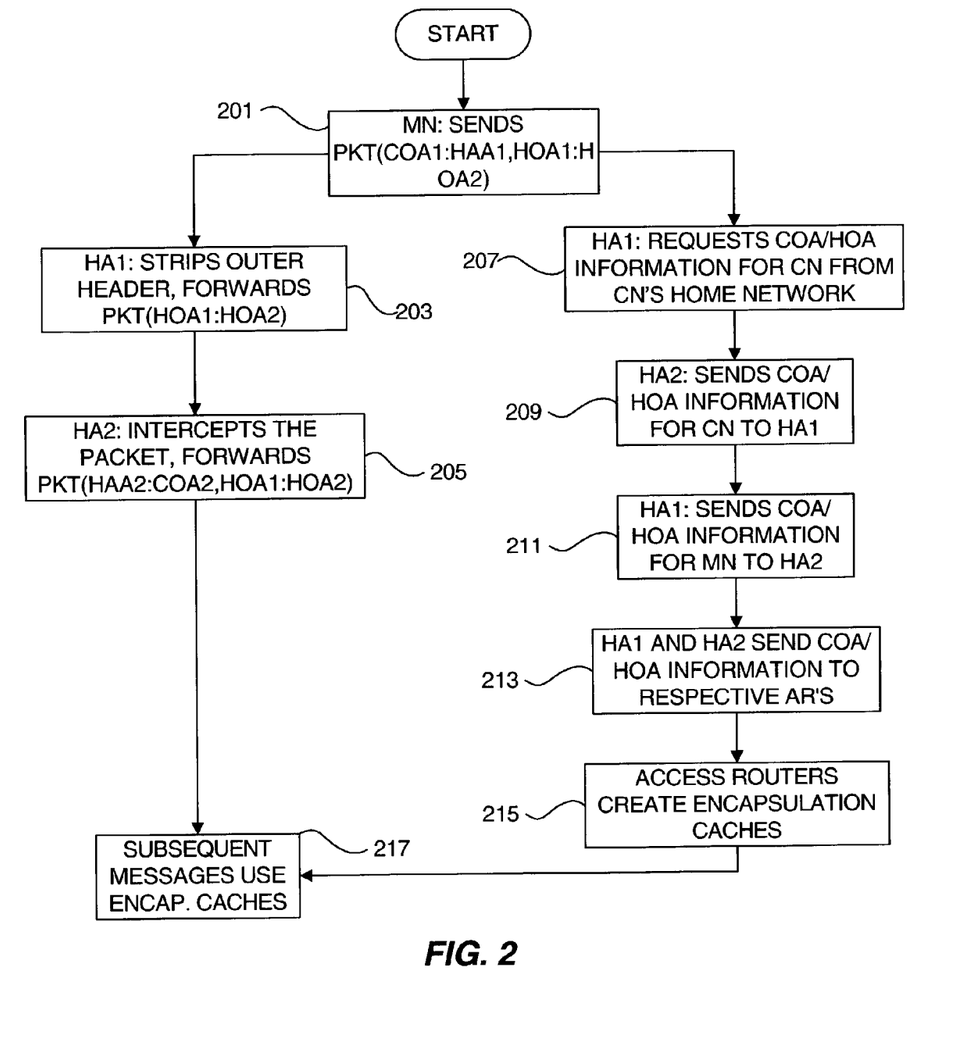
FIG. 2 illustrates a method of providing end-to-end privacy according to an illustrative embodiment of the invention.

A general method for communicating between two mobile terminals according to an illustrative embodiment of the invention will be described with further reference to FIG. 2, based on the above-described architecture. The form PKT (X:Y) is used herein to indicate a packet with an address header indicating X as the source address and Y as the destination address. The form PKT(X:Y,A:B) indicates that a packet with an address header indicating A as the source address and B as the destination address is encapsulated within another packet with address header indicating X as the source address and Y as the destination address. There are existing methods to enable such encapsulation as specified in IETF RFC 2003 (IP encapsulation within IP) and RFC 2004 (minimal encapsulation within IP). Initially, in step 201, MN 105 sends a packet PKT(CoA1:HAA1,HoA1: HoA2), e.g., a voice packet, application data, etc., to AR 109 for delivery ultimately to CN 117, using known reverse tunneling techniques. This packet is routed by the network to HA1 (i.e., router 103).

In step 203, HA1 strips the packet of the outer header and sends data packet PKT(HoA1:HoA2) into the network. In step 207, the HA1 sends a control message in another PKT(HAA1:HoA2) requesting an indication if CN 117 is away from the home network, and if so, requesting the CoA2 information. If CN 117 is away from the home network (as shown in FIG. 1), both of these packets are intercepted by HA2115. The data packet PKT(HoA1:HoA2) is forwarded by HA2115 to the CN 117 as PKT(HAA2:CoA2,HoA1: HoA2), in step 205. In response to control message in step 207, in step 209, the HA2 sends message to HA1 in PKT(HAA2:HAA1), informing the latter the address of HA2, i.e., HAA2 as well as CoA2/HoA2 binding information for CN 117. Optionally, HA2 also includes the address of AR 121, i.e., ARA2 in this message to HA1. In step 211, HA1 then sends to HA2 the CoA1/HoA1 binding information for MN 105 and address of AR 109, i.e. ARA1.

Then in step 213, HA1 and HA2 forward the CoA/HoA binding information for both the mobile terminal 117, i.e., CN, and the mobile terminal 105, i.e., MN, to each of the access router 109 and access router 121. HA1 may also forward the address ARA2 to AR 109 and HA2 may forward the address ARA1 to AR 121. In step 215, each access router stores the binding and remote access router address information in a special cache, termed an encapsulation cache, to which it can refer for delivery of subsequent messages in step 217.

A preferred embodiment for sending messages in steps 207, 209, 211 and 213 is the use of ICMP (Internet Control Message Protocol) messages with well-defined and standardized message types. It is also preferable that these messages are authenticated and/or encrypted. The authentication prevents against unauthorized nodes spoofing the messages and the encryption prevents against unauthorized nodes snooping on these messages during transit. The authentication and/or encryption may be based on the security associations (SAs) derived from the trust relationships between the various networks. For example, the messages in steps 207, 209 and 211 can be protected using the SA between the home network 101 of MN 105 and the home network 113 of CN 117. This SA may be created from or based on the existing trust relationship between networks 101 and 113. Similarly, message from HA1 to AR 109 in step 213 can be protected using the SA between the home network 101 of MN 105 and the foreign network 107, and the message from HA2 to AR 121 can be protected using SA between the home network 113 of MN 117 and the foreign network 119.

During the above procedure, if CN 117 is in the home network (unlike shown in FIG. 1), there will not be any home agent associated with it and CN 117 itself intercepts the data packet sent in step 203. In other words, step 205 might not be required. However, the packet sent in step 207 must be intercepted by a router in network 113 that ultimately forwards the packet to the CN. The said router can identify such packets using an ICMP type value in their header. In step 209, this said router sends a message to HA1 informing the HA1 about the CoA2 (which is the same as HoA2) of CN as well as providing the HA1 with its own address. In this case, in step 211, HA1 forwards CoA1/HoA1 and ARA1 information to this said router. This is the router which will also maintain the encapsulation cache on the CN side. In an alternative preferred embodiment, the said router, rather than communicating directly with HA1, takes assistance of some network entity in network 113 for the above message transaction. This would have the advantage of maintaining inter-network SA information only in some special network entities.

Figure 3:
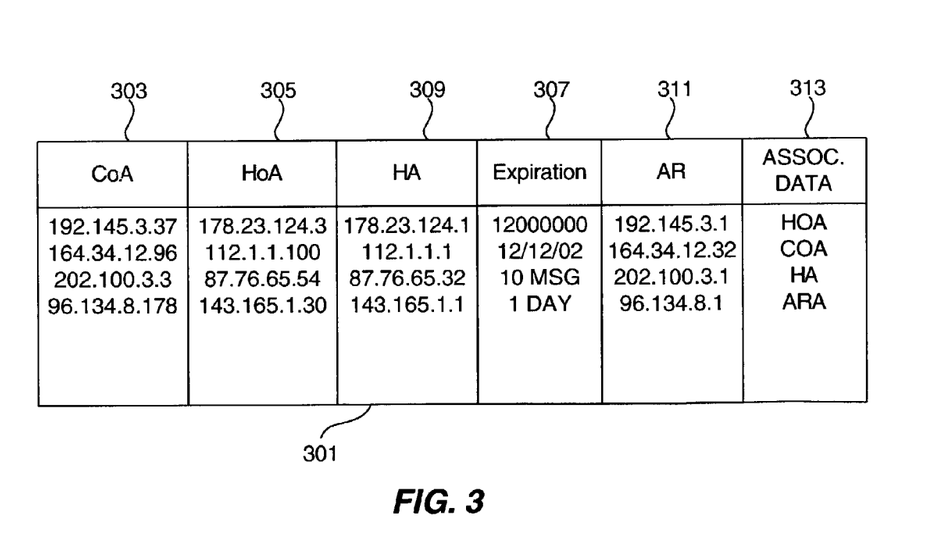
FIG. 3 illustrates data stored in an encapsulation cache according to an illustrative embodiment of the invention.

An example of data that may be stored in an encapsulation cache 301 is illustrated in FIG. 3. The encapsulation cache 301 includes entries (illustrated by rows in FIG. 3) that may have a Care-of-Address 303 and its corresponding Home-Address 305. The encapsulation cache may optionally also include the address of the Home Agent 309 corresponding to the Home-Address 305 and the address 311 of the access router (AR) corresponding to the Care-of-Address 303. The entire encapsulation cache, or alternatively each CoA/HoA binding in the encapsulation cache, may have corresponding expiration information 307. The association information 313 about the communicating end points may also be optionally included.

The expiration information can be derived from (or be the same as) the lifetime of the associated binding caches at the respective HAs of MN 105 and CN 117. After the expiration time has elapsed, the encapsulation cache entry for the associated node is deleted or otherwise made unusable, and steps 201–211 may be repeated as applicable to recreate the binding. Association information 313 may be used to store data about the MN/CN relationship. That is, where an access router handles privacy as described herein for multiple simultaneous communication sessions (e.g., MN1 to CN1, MN2 to CN2, MN3 to CN3, etc.), the access router can maintain, using the encapsulation cache, a record of which MN is communicating with which CN (i.e., the access router can determine that MN1 is communicating with CN1, not CN2). For example, association information 313 may store one or more of the home address, care-of address, home agent address, and access router address corresponding to an other node with which the node handled by the access router is communicating, or vice versa.

When the MN or CN move from the current location, these caches can be moved to the ARs at their new points of connectivity using existing techniques such as context transfer, as described in the IETF specification Context Transfer Protocol (draft-ietf-seamoby-ctp-00.txt), October 2002 (work in progress). The expiration time may be expressed in any form that allows a router to positively determine when the binding expires. For example, the expiration time may be expressed in milliseconds (Row 1), a date on which the binding information expires (Row 2), a number of messages after which the binding expires (Row 3), or after a specified number of days from the binding's creation (Row 4). Other expiration expressions may alternatively be used as desired. When the expiration is expressed as a time in milliseconds or a number of days, the encapsulation cache may include another field in which the date of creation of each binding is stored (not shown). The encapsulation cache at AR 109 contains CoA/HoA binding for mobile terminal 117 and its associated AR router 121. It also contains CoA/HoA binding information for mobile terminal 105. Similarly, the encapsulation cache at AR 121 contains CoA/HoA bindings for mobile terminals 105 and its associated AR router 109, and also for mobile terminal 117.

Returning to FIG. 2 again, in step 217, the MN 105 desiring to send a subsequent packet PKT(CoA1:HAA1, HoA1:HoA2) to CN 117 using reverse tunneling, forwards the packet to AR 109 for delivery. Based on the presence of an unexpired binding in the encapsulation cache, AR 109 determines that HoA2 corresponds to CoA2. AR 109 converts this packet into one of the following alternatives: (a) PKT(CoA1:CoA2,HoA1:HoA2), (b) PKT(ARA1:CoA2, HoA1:HoA2), (c) PKT(CoA1:ARA2,HoA1:HoA2) or (d) PKT (ARA1:ARA2,HoA1:HoA2), and sends it into the network for subsequent delivery to CN 117. This packet follows a direct path (i.e., route optimized path) from AR 109 to AR 121.

AR 121, upon receiving the packet, performs the following: For cases (a) and (b) it checks its encapsulation cache, and concludes that the destination address CoA2 has a cache entry. The AR 121 then strips the outer header and sends PKT(HoA1: HoA2) to the CN 117. For cases (c) and (d), since the outer packet header is addressed to AR 121, the AR 121 examines the packet. The AR 121 strips the outer header and finds out from the encapsulation cache that HoA2 in the inner header is associated with CoA2. The AR 121 then sends PKT(HoA1:HoA2) to the CN 117. In all these cases, AR 121 may also perform an additional check on the packet source addresses to confirm the session identity before performing the actions described above. Subsequent packets may be sent in similar fashion, bypassing the need to route every packet through HA1 and/or HA2 as long as the encapsulation cache or the applicable entry in the encapsulation cache has not expired. As an alternate embodiment for sending a packet from AR 121 to CN 117, AR 121 may convert the arriving packet to PKT(AAR2:CoA2,HoA1: HoA2) or PKT(HAA2:CoA2,HoA1:HoA2), and send it to CN 117.

Figure 4:
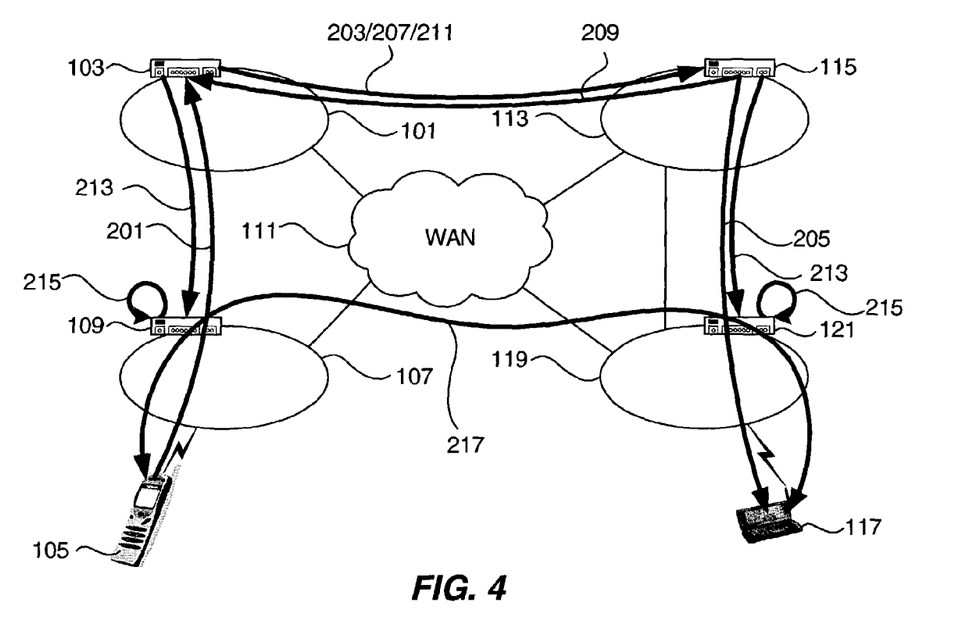
FIG. 4 illustrates the architecture of FIG. 1 overlaid with message indicators described by FIG. 2.

In step 217, the CN 117 desiring to send a subsequent packet PKT (CoA2:HAA2,HoA2:HoA1) to MN 105, forwards the packet to AR 121 for delivery. AR 121, based on the presence of an unexpired binding in the encapsulation cache, determines that HoA1 corresponds to CoA1. AR 121 converts the received packet into PKT(CoA2:CoA1,HoA2: HoA1) and sends it into the network for subsequent delivery to MN 105. Alternate embodiments such as converting to PKT(ARA2:CoA1,HoA2:HoA1), PKT(CoA2:ARA1, HoA2:HoA1) or PKT(ARA2:ARA1,HoA2:HoA1) are also possible. This packet follows a direct path (i.e., route optimized path) from AR 121 to AR 109. The AR 109, then forwards PKT(HoA2:HoA1) or PKT(ARA1:CoA1,HoA2: HoA1) or PKT(HAA1:CoA1,HoA2:HoA1) to the MN 105. FIG. 4 illustrates the architecture of FIG. 1 overlaid with message indicators as described by the method of FIG. 2.

Thus, throughout the communication, both MN 105 and CN 117 are only able to determine the home address of the other node. That is, CN 117 cannot determine that messages from MN 105 originated anywhere other than the home network address of MN mobile terminal 105. Likewise, MN 105 cannot determine that messages from CN 117 originated anywhere other than the home network address of CN mobile terminal 117. In addition, each mobile terminal delivers packets to the other mobile terminal knowing only the other mobile terminal's home address, and not an actual address when the other mobile terminal is roaming on another network. By using the inventive method described herein, mobile terminals can communicate while maintaining location privacy, and not be required to route all messages through each respective mobile terminal's home network or home agent, which would quickly overload or substantially slow the performance of the home agent(s).

One skilled in the art will appreciate that variations to the above-described method are possible without departing from the scope or spirit of the inventive methods. For example, it is possible that only one of the sender and the receiver may desire location privacy. Suppose MN desires location privacy, while the CN does not request it. Then, MN opts for reverse tunneling, while CN may not opt for reverse tunneling. Then, in step 217 of FIG. 2, the MN sends PKT(CoA1:HAA1,HoA1:CoA2), and AR 109 converts it to PKT(CoA1:CoA2,HoA1:CoA2) or PKT(ARA1:CoA2, HoA1:CoA2) or PKT(CoA1:ARA2,HoA1:CoA2) or PKT (ARA1:ARA2,HoA1:CoA2) and sends it into the network. This packet reaches AR 121 over route-optimized path, and AR 121 forwards PKT(HoA1:CoA2) or PKT(ARA2:CoA2, HoA1:CoA2) or PKT(HAA2:CoA2,HoA1:CoA2) to CN 117. In the reverse direction, however, CN 117 sends PKT (CoA2:HoA1), and AR 121 converts this packet to PKT (CoA2:CoA1,CoA2:HoA1) or PKT(ARA2:CoA1,CoA2: HoA1) or PKT(ARA2:ARA1,CoA2:HoA1) or PKT(CoA2: ARA1,CoA2:HoA1). AR 109 forwards the packet PKT (CoA2:HoA1) or PKT(ARA1:CoA1,CoA2:HoA1) or PKT (HAA1:CoA1,CoA2:HoA1) to MN 105.

While the above embodiment was described with reference to Mobile IP architecture and terminology, the invention is not limited to Mobile IP. For example, MN 105 and CN 117 may communicate using simple IP. In this case, MN 105 acquires a care-of IP address (CoA1) from a pool of IP addresses assigned to network 107, using procedures such as DHCP (Dynamic Host Configuration Protocol) or GPRS and UMTS PDP (Packet Data Protocol) or using PPP (Point to Point Protocol). Similarly, CN 117 can acquire a care-of IP address (CoA2) from a pool of addresses assigned to network 119. MN 105 and CN 117 need not have home agents in their respective home networks. However, they should have home IP addresses (HoAs) assigned from pools of addresses in their respective home networks. The establishment of one or more encapsulation caches in this case can be done via other signaling schemes.

Another embodiment is as follows: MN 105 sends a PKT(HoA1:HoA2) to AR 109 over the access link. The AR 109 checks the encapsulation cache and converts this packet to one of the following alternatives: (a) PKT(CoA1:CoA2, HoA1:HoA2) or (b) PKT(ARA1:CoA2,HoA1:HoA2) or (c) PKT(CoA1:ARA2,HoA1:HoA2) or (d) PKT(ARA1:ARA2, HoA1:HoA2), and sends it into the network. This packet gets routed toward network 119 over route-optimized path. When AR 121 receives this packet, it converts the packet into PKT(HoA1:HoA2) or PKT(ARA2:CoA2,HoA1:HoA2) or PKT(HAA2:CoA2,HoA1:HoA2) for delivery to CN 117. In this case the MN may be made aware that its privacy will be protected by AR 109 and that MN does not need to attempt to use reverse tunneling. In an alternative embodiment, AR 109 replaces HoA1 with CoA1 and HoA2 with CoA2, and send the packet PKT(CoA1:CoA2) into the network. The AR 121, upon receiving this packet, replaces CoA1 with HoA1 and CoA2 with HoA2 and delivers the packet to the CN.

In some of the embodiments described above CoA/HoA binding information can be derived from packets as they propagate on path between the access routers. For example, in one embodiment (called alternative (a) above), a route-optimized packet from MN 105 to CN 117 travels as PKT(CoA1:CoA2,HoA1:HoA2) between AR 109 and AR 121. If some untrusted network entity on this path snoops on this packet, it can derive CoA/HoA binding information for MN and CN form the headers of this packet, and hence, their current geographic location will be revealed to this entity, which in turn may use it for undesirable purposes. To guard against this, in one preferred embodiment, AR 109 replaces HoA1 and HoA2 in the inner header with other values such as random numbers, all zero bits, all one bits, constant number etc. The AR 121 then replaces those values with HoA1 and HoA2 before forwarding the packet to CN. In embodiments (b), (c) and (d) however, where access router address(es) is used in outer header, the number(s) used to replace the corresponding HoA field value(s) needs to be prenegotiated. Prenegotiation can happen during the procedure for creation of the encapsulation cache, depicted in FIG. 2. For this, the access router proposes a number that is locally unique for use by the remote access router for replacing a specific HoA filed value. Then, for example in case (d), after converting the packet to PKT(ARA1:ARA2, HoA1:HoA2), the AR 109 replaces HoA1 with the prenegotiated number x and HoA2 with prenegotiated number y, and sends packet PKT(ARA1:ARA2,x:y) into the network. The AR 121 upon receiving this packet, consults its encapsulation cache to determined HoAs that numbers x and y correspond to and replaces x and y with respective HoAs. Note that numbers x and y should be at least locally unique at AR 121.

While the encapsulation cache may be established at the ARs from which the MN and CN get their Internet or network connectivity, this may not always be possible. For example, a trust relationship might only exist between the home agent router 103 and a router upstream in the path from router 103 to AR 109. In this case, the encapsulation cache may be stored in a location upstream in the network towards the home network of the mobile terminal where a trust relationship can be found. In the worst-case scenario when no trust relationship can be found in the path between the AR and the HA, the scheme falls back to traditional reverse tunneling. In the event that both AR 109 and AR 121 are not in the MN and CN's immediate sub-nets, respectively, then additional signaling may be required to inform the routers storing the encapsulation caches about each other's identity. For example, prefixes may be used to try to find another network with a close prefix. Network tools such as or similar to trace route can be used to find out the route the packet takes from the HA to the AR, and then determine whether a trusted AR is found.

Another embodiment for the location of the encapsulation caches is the HA or other routers in the home network of a mobile node. For example, when both the CN and MN desire privacy and the CN has not moved out of its domain. Now the encapsulation caches will be located, using terminology from FIG. 1, at router 109 and HA 115 (or other routers in the home network 113 of CN 117). This embodiment is also applicable for use in which a mobile node is accessing a "static" Internet node, a web-server, for example. In this case, only the MN (node 105) needs privacy and the CN (web server) does not.

It is also possible that location privacy is only provided upon request of the user or owner of the mobile terminal. That is, if a user does not request, and optionally pay, for location privacy, messages sent from that user's mobile terminal may appear to originate from the care-of-address (CoA) of the mobile terminal while roaming instead of the home address (HoA).

According to an aspect of the invention, the mobile node may use a security association (SA) that the MN has with its home agent (e.g., HA1) to send packets to the home agent. This may be done in order to maintain security of packets transmitted between the MN and its home agent. In this case, HA1 may send an appropriate encryption/decryption key (e.g., public key, session key, etc.) that can be used to decrypt MN's packets at the AR serving the MN. The key information may be stored as part of the MN's information in the encapsulation cache (not shown) in order to help the AR decrypt the packets sent from the MN and apply the optimized routing schemes described above.

Using the above-described method, communicating nodes (such as mobile terminals) can maintain location privacy while roaming on other telecommunications networks. As a mobile terminal moves to a new network, the method can be repeated to establish new encapsulation caches and update existing encapsulation caches on the access routers, as applicable. Another embodiment is using existing techniques such as context transfer to transfer the encapsulation cache to the new AR as part of the node's context. In the event that a mobile terminal moves to a network for which there is no existing trust relationship, the system may revert to using standard reverse tunneling techniques.

One or more aspects of the invention may be embodied in computer-executable instructions, such as in one or more program modules, executed by one or more computers, mobile terminals, access routers, or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method for routing messages from a sending host by an access router in a telecommunications network other than the sending host's home network, comprising:
   receiving a first message from the sending host for delivery to a receiving host;
   sending the first message to a home network of the sending host;
   receiving optimized routing information from the home network of the sending host;
   receiving a second message from the sending host for delivery to the receiving host; and
   routing the second message to the receiving host based on the received information without sending the second message to the home network of the sending host.

2. The method of claim 1, wherein the first message comprises a reverse tunneled packet.

3. The method of claim 1, wherein the first message comprises a request to provide location privacy service.

4. The method of claim 1, wherein the second message comprises a reverse tunneled packet.

5. The method of claim 1, wherein the second message comprises a destination address indicating the home address of the receiving host.

6. The method of claim 1, further comprising storing the received optimized routing information in an encapsulation cache in a location outside the sending host's home network.

7. The method of claim 1, wherein the received optimized routing information is encrypted.

8. The method of claim 1, wherein the telecommunications network in which the access router is located and the sending host's home network have a trust relationship.

9. A method for routing messages from a sending host by an access router in a telecommunications network other than the sending host's home network, comprising:
   receiving a first message;
   sending the first message to a home network of the sending host;
   receiving optimized routing information from the home network of the sending host;
   receiving a second message; and
   routing the second message based on the received information,
   wherein the second message comprises a destination address indicating a care-of address of a receiving host.

10. A method for routing messages from a sending host by an access router in a telecommunications network other than the sending host's home network, comprising:
    receiving a first message;
    sending the first message to a home network of the sending host;
    receiving optimized routing information from the home network of the sending host;
    receiving a second message; and
    routing the second message based on the received information,
    wherein the received optimized routing information comprises home address to care-of address binding information corresponding to a receiving host.

11. A method for routing messages from a sending host by an access router in a telecommunications network other than the sending host's home network, comprising:
    receiving a first message;
    sending the first message to a home network of the sending host;
    receiving optimized routing information from the home network of the sending host;
    receiving a second message; and
    routing the second message based on the received information,
    wherein the received optimized routing information comprises home address to care-of address binding information corresponding to the sending host.

12. A method for routing messages from a sending host by an access router in a telecommunications network other than the sending host's home network, comprising:
    receiving a first message;
    sending the first message to a home network of the sending host;
    receiving optimized routing information from the home network of the sending host;
    receiving a second message; and
    routing the second message based on the received information,
    wherein routing comprises:
    determining a care-of address for a receiving host based on the received optimized routing information; and
    sending a modified second message comprising a destination address indicating the care-of address for the receiving host.

13. The method of claim 12, wherein the modified second message further comprises a source address indicating a care-of address for the sending host.

14. The method of claim 12, wherein the modified second message comprises an encapsulation of the second message with the destination address.

15. The method of claim 14, further comprising replacing the address information in an inner header of the encapsulated message with an other value.

16. The method of claim 15, wherein the other value is taken from the set of random numbers, all zero bit number, all 1 bit number, and constant numbers.

17. The method of claim 14, wherein the received optimized routing information comprises a value to be used for replacing an address in the inner header of the encapsulated message.

18. A method for routing messages from a sending host by an access router in a telecommunications network other than the sending host's home network, comprising:
    receiving a first message;
    sending the first message to a home network of the sending host;
    receiving optimized routing information from the home network of the sending host;
    receiving a second message; and
    routing the second message based on the received information,
    wherein the received optimized routing information comprises an address of an access router corresponding to a current location of a receiving host.

19. A method for routing messages from a sending host by an access router in a telecommunications network other than the sending host's home network, comprising:
    receiving a first message;
    sending the first message to a home network of the sending host;
    receiving optimized routing information from the home network of the sending host;
    receiving a second message; and
    routing the second message based on the received information, wherein routing comprises:
  determining an address of an access router corresponding to a current location of a receiving host based on the received information;
  sending a modified second message comprising a destination address indicating the access router corresponding to the current location of the receiving host.

20. The method of claim 19, wherein the modified second message further comprises a source address indicating the access router in the telecommunications network other than the sending host's home network.

21. The method of claim 19, wherein the modified second message comprises an encapsulation of the second message with the address information.

22. The method of claim 21, further comprising replacing the address information in the inner header of the encapsulated message with an other value.

23. The method of claim 22, wherein the other value is locally unique at the access router corresponding to the receiving host.

24. The method of claim 23 wherein the other value is prenegotiated between the access routers.

25. A method for routing messages from a sending host by an access router in a telecommunications network other than the sending host's home network, comprising:
  receiving a first message;
  sending the first message to a home network of the sending host;
  receiving optimized routing information from the home network of the sending host;
  receiving a second message; and
  routing the second message based on the received information,
  wherein routing comprises:
  determining an address of an access router corresponding to a current location of a receiving host based on the received information; and
  sending a modified second message comprising a destination address indicating the address of the access router corresponding to the current location of the receiving host.

26. The method of claim 25, wherein the modified second message further comprises a source address indicating a care-of address for the sending host.

27. The method of claim 25, wherein the modified second message comprises an encapsulation of the second message with the destination address.

28. The method of claim 25, wherein the receiving host comprises a mobile terminal.

29. A method for routing messages to a receiving host in a telecommunications network by an access router corresponding to the receiving host, comprising:
  receiving optimized routing information about home address to care-of address binding of the receiving host and a sending host;
  receiving a message from the sending host;
  determining that the message needs location privacy based on the received optimized routing information; and
  routing the message to the receiving host.

30. The method of claim 29, wherein routing comprises decapsulating the message.

31. The method of claim 30, further comprising encapsulating the message with new address information and forwarding it to the receiving host.

32. The method of claim 29, wherein the receiving host comprises a mobile terminal.

33. The method of claim 29, further comprising intercepting a request message requesting binding information, wherein the request message is addressed to a home address of the receiving host, when the receiving host is on a home network.

34. The method of claim 29, further comprising generating a locally unique value to be used by an access router corresponding to the sending host for replacing an address in an inner header of encapsulated messages sent to the receiving host.

35. The method of claim 29 wherein the received optimized routing information further comprises an address of an access router corresponding to the sending host.

36. The method of claim 29 further comprising storing the received optimized routing information in an encapsulation cache.

37. The method of claim 36, wherein determining comprises comparing source and destination addresses in the received message with entries in the encapsulation cache.

38. The method of claim 29, wherein the information corresponding to the receiving host comprises a code, and wherein determining comprises looking up the address corresponding to the receiving host, based on the code, in a cache.

39. The method of claim 29, wherein a source address of the sending host and the optimized routing information each comprise a care-of address, and
  wherein determining comprises replacing each care-of address with a corresponding home address.

40. A method for routing messages in a telecommunications network comprising:
  receiving at a home network of a sending host, a first message comprising a destination address indicating a home address of a receiving host;
  sending a request to the home network of the receiving host;
  receiving alternative routing information from the home network of the receiving host;
  sending the alternative routing information to an access router, corresponding to the sending host, on a network other than a home network of the sending host, for use by the access router to route messages from the sending host to the receiving host without routing messages through the home network of the receiving host.

41. The method of claim 40, wherein the first message comprises a reverse tunneled packet.

42. The method of claim 40, wherein the first message comprises a request for location privacy.

43. The method of claim 40, wherein the information comprises home address to care-of address binding information corresponding to the receiving host.

44. The method of claim 40, wherein the received information comprises an address of an access router corresponding to the receiving host.

45. The method of claim 40, wherein the received information comprises an address of a home agent corresponding to the receiving host.

46. The method of claim 40, further comprising sending to a network entity in the home network of the receiving host, home address to care-of address binding information corresponding to the sending host.

47. The method of claim 40, wherein the receiving host comprises a mobile terminal.

48. A method for routing messages in a telecommunications network, comprising:

receiving at a home network of a sending host, a first message comprising a destination address indicating a home address of a receiving host;

sending a request to the home network of the receiving host;

receiving information from the home network of the receiving host;

sending the received information to an access router, corresponding to the sending host, on a network other than a home network of the sending host, wherein the received information comprises a number to be used for replacing an address field in an inner header of an encapsulated message.

49. The method of claim 40, wherein the received information is received from a home agent of the receiving host.

50. A method for routing messages at a home network corresponding to a receiving host in a telecommunications network, comprising:

receiving at the home network of the receiving host a packet for delivery to the receiving host;

sending alternative routing information corresponding to the receiving host to a home network of a sending host; and receiving alternative routing information corresponding to the sending host from the home network of the sending host, wherein the alternative routing information corresponding to the receiving host comprises home address to care-of address binding information corresponding to the receiving host.

51. The method of claim 50, wherein the packet is received by a home agent of the receiving host.

52. The method of claim 50, wherein the packet is received by a router in the home network of the receiving host, upstream to the receiving host.

53. The method of claim 52, further comprising the router communicating with a network entity in the home network of the receiving host in order to send and receive the alternative routing information.

54. The method of claim 50, wherein the alternative routing information corresponding to the receiving host comprises an address of an access router corresponding to the receiving host.

55. The method of claim 50, wherein the alternative routing information corresponding to the receiving host comprises an address of a home agent corresponding to the receiving host.

56. The method of claim 50, wherein the alternative routing information corresponding to the sending host comprises home address to care-of address binding information corresponding to the sending host.

57. The method of claim 50, wherein the alternative routing information corresponding to the sending host comprises an address of an access router corresponding to the sending host.

58. The method of claim 50, further comprising sending the alternative routing information corresponding to the sending host to an access router of the receiving host.

59. A method for routing messages at a home network corresponding to a receiving host in a telecommunications network, comprising:

receiving at the home network of the receiving host a packet for delivery to the receiving host;

sending alternative routing information corresponding to the receiving host to a home network of a sending host; and receiving alternative routing information corresponding to the sending host from the home network of the sending host, wherein the alternative routing information corresponding to the receiving host and the alternative routing information corresponding to the sending host each comprises a value to be used for replacing an address field in an inner header of an encapsulated message.

60. The method of claim 59, further comprising receiving from an access router of the receiving host, the value to be used for replacing the address field in the inner header of the encapsulated message.

* * * * *